United States Patent

[11] 3,572,018

[72] Inventor Vernon P. Broussard
P.O. Box 227, St. Martinville, La. 70582
[21] Appl. No. 799,768
[22] Filed Feb. 17, 1969
[45] Patented Mar. 23, 1971

[54] ATTACHMENT TO SUGAR CANE HARVESTER
3 Claims, 4 Drawing Figs.
[52] U.S. Cl. .................................................. 56/119,
56/98
[51] Int. Cl. ................................................ A01d 45/02,
A01d 45/10
[50] Field of Search ........................................ 56/16, 17,
18, 119, 15, 98, 106; 171/120

[56] References Cited
UNITED STATES PATENTS
1,513,833 11/1924 Little ............................. 171/118
2,515,966 7/1950 Polisena ........................ 171/120
3,331,196 7/1967 Grant ............................. 56/98X Primary Examiner—Russell R. Kinsey
Attorney—James B. Lake, Jr ABSTRACT: Two tracks having rounded ends respectively mounted by swing bars outboard of and partially extended forward of and to upright-cane gathering apparatus having sticker chains with stickers extending in transverse planes for gathering standing cane, said swing bars being adapted to swing in vertical planes to allow the lower ends of the tracks to rest on and move over uneven ground, and endless sticker chains adapted to travel on said outboard tracks with the stickers extending in planes normal to the stickers of the upright-cane gathering apparatus, for gathering fallen cane in approximately horizontal position.

PATENTED MAR 23 1971 3,572,018

INVENTOR.
VERNON P. BROUSSARD
BY James B. Lake, Jr.
ATTORNEY

ATTACHMENT TO SUGAR CANE HARVESTER

The invention relates generally to sugarcane harvesters and more particularly to an attachment thereto for gathering fallen cane laying in approximately horizontal position.

Heretofore cane that is blown down or fallen flat on the ground was passed over by the gathering apparatus because the stickers of the sticker chains extended generally in planes parallel to the fallen cane and thus did not pick up and gather the fallen cane.

It is an object of the invention to provide easy and positive means for gathering the fallen cane that is additional to the means for gathering standing cane.

Another object of the invention is to provide means for the fallen cane gathering attachment to pass easily over uneven ground.

Other objects and a fuller understanding of the invention may be had by referring to the following specifications and claims, taken together with the accompanying drawings, in which:

Figure 1:
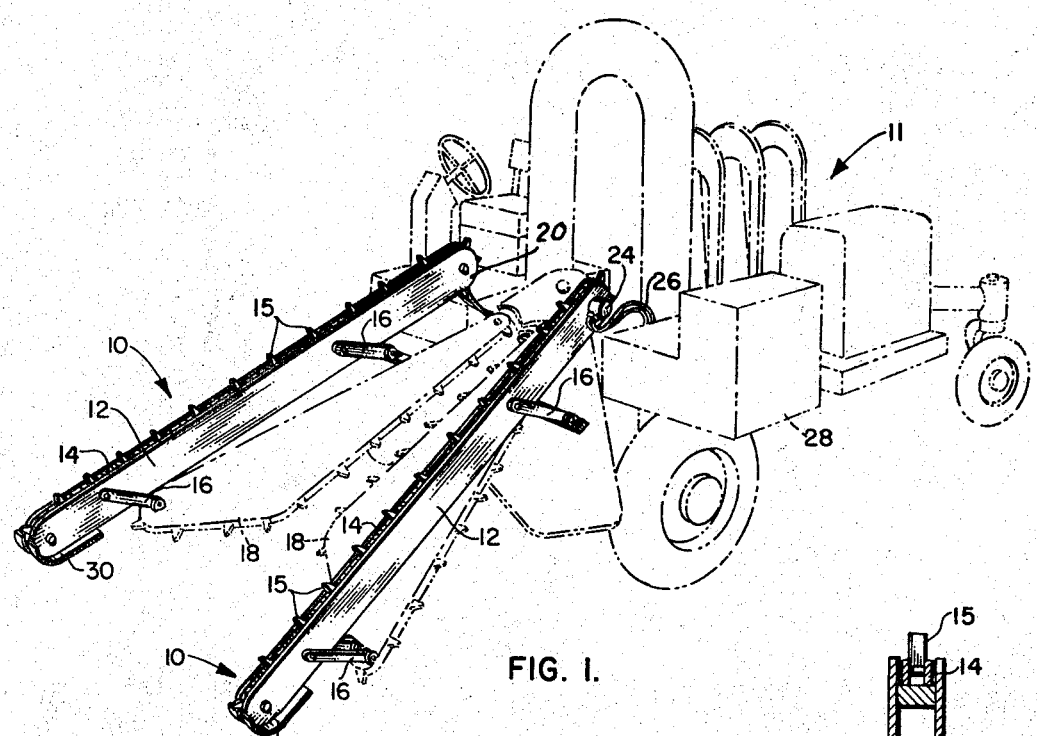
FIG. 1 is a perspective view of the invention mounted on a sugarcane harvester.
Figure 3:
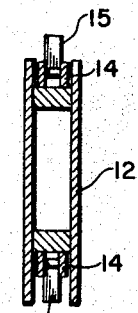
FIG. 3 is a cross-sectional view taken along section lines 3—3 of FIG. 2.
Figure 2:
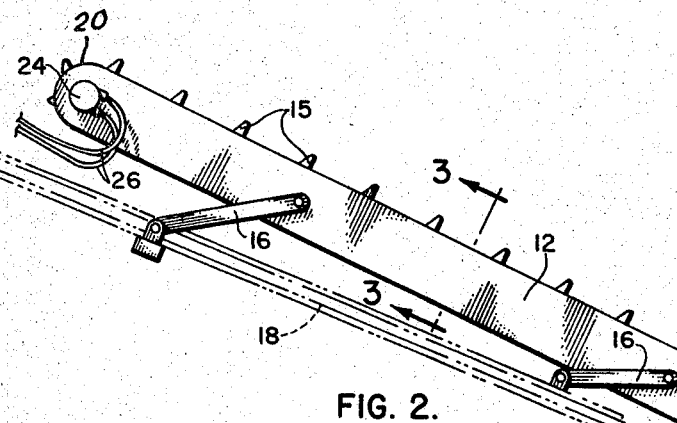
FIG. 2 is a partially cutaway side view of the invention showing details of swing bars mounting and endless sticker chain mounting.

Referring to FIGS. 1 and 2, the invention is a fallen cane gathering attachment 10 for a sugarcane harvester 11 and comprises a pair of tracks 12. Sticker chains 14 are respectively mounted on tracks 12 for endless rotation in vertically disposed runs with stickers 15 projecting upward on the upper run (see FIGS. 2 and 3). Swing bars 16 swingably mount the respective tracks 12 on the respective outboard portions of the upright-cane gathering apparatus 18 to extend beyond the lower ends of the apparatus 18 with the swing bars 16 swung fully forward and back.

The respective tracks 12 have rounded upper ends 20 and lower ends 22. An hydraulic motor 24 is mounted on the respective upper ends 20 of the tracks 12 for driving the respective sticker chains 14. Hydraulic lines 26 connect said hydraulic motors with the power train 28 power takeoff to provide the necessary hydraulic power to rotate the sticker chains 14 in their endless runs. A shoe 30 covers part of the tracks and ground engaging ends for facilitating movement over uneven ground and to prevent the stickers 15 from digging into the ground (see FIGS. 2 and 4).

Figure 4:
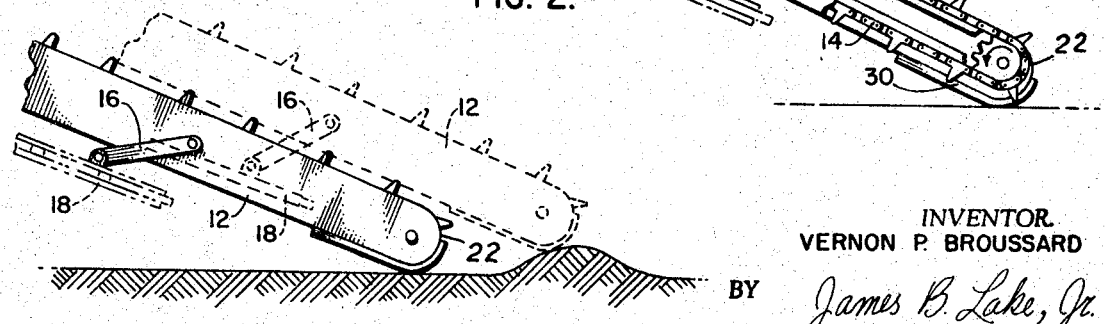
FIG. 4 is a partial side and phantom view of the invention passing over uneven ground.

In operation the upright-cane gathering apparatus with the invention attached and the swing bars rotated forward is lowered until the shoes 30 at the lower ends of tracks 12 rest on the ground as illustrated in FIGS. 1 and 2. The sticker chains 14 are driven in their runs and the outwardly projecting stickers 15 at the lower ends of tracks 12 and the upwardly projecting stickers 15 in the upper runs of said sticker chains engage any horizontal or almost so cane positioned between the tracks 12 and raise the free ends of the stalks to engagement with the upright-cane gathering apparatus 18. As the harvester moves forward pushing the attached cane gathering apparatus ahead of it, any unevenness in the ground will raise and lower the tracks by operation of the swing bar mounting as shown in FIG. 4.

It is understood that the disclosure that has been made is the best combination and arrangement of parts known to the inventor and that numerous changes can be made therein without departing from the spirit and scope of the invention.

I claim:

1. On a sugar harvester having a power train and with a standing-cane gatherer mounted in front and slanting forwardly and downwardly therefrom, a pickup attachment therefor for picking up fallen cane and comprising: linear tracks having opposite and longitudinally disposed ends and opposite and vertically spaced runways; mounting means for independently mounting said tracks over the respective right and left sides of said slantably mounted cane gatherer, and linearly movable with respect thereto, for the lower of said oppositely disposed track ends to move forwardly and downwardly to the ground in superimposed projection of said forwardly and downwardly slanting cane gatherer; sticker chains having outwardly extending stickers respectively mounted on said linearly movable tracks for endless movement of the vertically spaced runs in the opposite and vertically spaced runways to pick up fallen cane; and power takeoff means mounted on said harvester and adapted to connect said power train to said sticker chains for driving them in an endless path around said tracks.

2. A pickup attachment as described in claim 1 wherein said mounting means comprise; swing bars having oppositely disposed ends pivoted respectively to said tracks, adjacent their opposite and longitudinally disposed ends, and to said cane gatherer, and adapted to pivotally swing said tracks upward and linearly rearward, and downward and linearly forward, as the lower end of said tracks, rising and falling, but unchanging angularly with respect to the cane gatherer and to level ground, pass over uneven ground.

3. A pickup attachment as described in claim 1 wherein shoes are mounted on the lower ends of said tracks for facilitating sliding passage over the ground and protection of the sticker chains.